CONVERSION METHOD AND APPARATUS
Filed June 22, 1962 11 Sheets-Sheet 1
Fig.1.
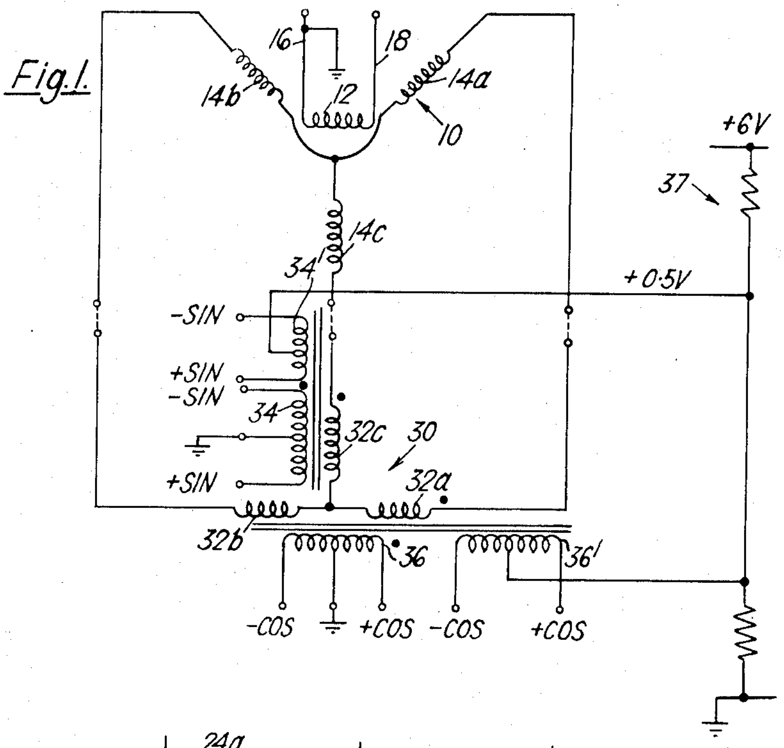
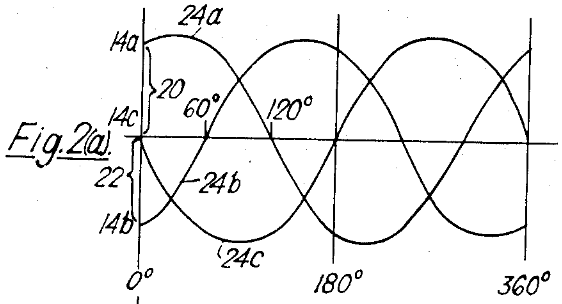
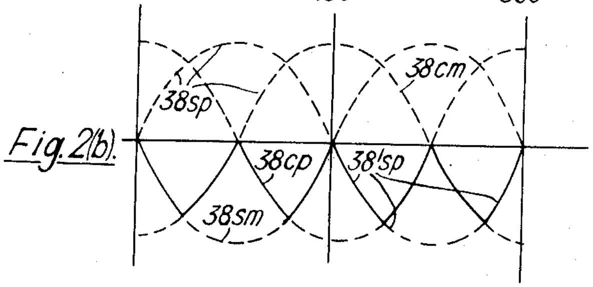
Inventors
Ian R. Young
John A. Phillips
By Kimon Palmer,
Stewart & Estabrook
Attorneys Inventor
Ian R. Young
John A. Phillips
By Kemon, Palmer,
Stewart & Estabrook
Attorneys

CONVERSION METHOD AND APPARATUS

Filed June 22, 1962 11 Sheets-Sheet 3

Inventor
Ian R. Young
John A. Phillips
By Kemon, Palmer,
Stewart & Estabrook
Attorneys Inventors
Ian R. Young
John A. Phillips
By Kemon Palmer
Stewart & Estabrook
Attorneys

CONVERSION METHOD AND APPARATUS

Inventors
Ian R. Young
John A. Philip
By Kemon, Palmer, Stewart & Estabrook
Attorneys Inventors
Ian R. Young
John A. Phelps
By Kemon, Palmer, Stewart & Estabrook
Attorneys Inventors
Ian R. Young
John A. Phillips
By Kemon, Palmer, Stewart & Estabrook
Attorneys

CONVERSION METHOD AND APPARATUS

Filed June 22, 1962 11 Sheets-Sheet 8

Inventors
Ian R. Young
John A. Phillips
By Kemon Palmer
Stewart & Estabrook
Attorneys Inventors
Ian R. Young
John A. Phillips
By Kemon, Palmer, Stewart & Estabrook
Attorneys Inventors
Ian R. Young
John A. Phelps
By Wenderoth, Palmer, Stewart & Estabrook
Attorneys

CONVERSION METHOD AND APPARATUS

Filed June 22, 1962

Inventors
Ian R. Young
John A. Phillips
By Kemon Palmer
Stewart & Estabrook
Attorneys United States Patent Office 3,205,492
Patented Sept. 7, 1965

3,205,492
CONVERSION METHOD AND APPARATUS

Ian R. Young, Sanderstead, Surrey, and John A. Phillips, Twickenham, Middlesex, England, assignors to Evershed and Vignoles Limited Filed June 22, 1962, Ser. No. 204,380
Claims priority, application Great Britain, June 28, 1961, 23,418/61
8 Claims. (Cl. 340—347)

There are many cases where it is desirable to be able to derive an output in digital form from alternating signals particularly sinusoidal signals. Such signals may be derived, for example, from a device commonly known as a synchro which is a highly developed unit and which at the moment is more reliable and widely accepted than any currently available shaft encoders. Very many equipments exist containing such synchros and it is obviously desirable to be able to obtain digital information from such equipment. Since a synchro has a rotor to which is applied an alternating current (which, since it defines a datum phase, is hereinafter referred to as a datum input signal) and also has three associated stator windings spaced apart by 120° from one another, the problem of deriving such information really amounts to deriving outputs in digital form from three alternating signals which, on rotation of the rotor, vary in magnitude in a substantially sinusoidal manner with the different sinusoidal magnitude envelopes phase shifted with respect to one another by 120°. It will be appreciated that the actual signals themselves are either in phase or out of phase with the datum input signal, depending on the position of the rotor.

A similar, but slightly different, problem exists in the case of devices commonly known as resolvers where the three stator windings of the synchro are replaced by two perpendicular windings or coils. With such a device only two alternating signals are in essence produced and these have magnitude envelopes which are phase shifted with respect to one another by 90° i.e. the magnitude envelopes are in quadrature. The problem here therefore amounts to deriving outputs in digital form from alternating signals having magnitude envelopes in quadrature.

The basic principle of the present invention is that the octant in which the rotor lies is first found with the aid of three devices which each have two conditions and which have therefore together eight possible conditions representing the different possible octant positions of the rotor, and the rotor position is then found to a higher degree of accuracy than this by making use of the fact that the magnitude or amplitude of one of the output signals varies substantially linearly with the angular position of the rotor within a predetermined range of this angular position.

An assembly according to the invention comprises electric coils, a rotor which on application of a datum input alternating signal and in any selected angular position thereof gives rise in the coils to respective alternating electric signals which, on rotation of the rotor, vary in magnitude in a substantially sinusoidal manner with the different sinusoidal magnitude envelopes phase shifted with respect to one another, the coils being arranged to control the conditions of three devices which each have two conditions and which have therefore together eight conditions representing the respective octant positions of the rotor, and also comprising means for selecting in the different rotor octant positions the electric signal of smaller amplitude of two signals whose magnitude envelopes are in quadrature, and means for presenting in digital form a result corresponding to this amplitude. In such an assembly, the three devices have between them eight possible conditions corresponding to the eight different octant ranges in the full 360°, and these devices thus enable the rotor position to be determined to the nearest octant, and presented in digital form. The accurate position of the rotor within the octant is obtained in digital form by the means referred to. Two advantages are obtained by selecting the electric signal of smaller amplitude from signals whose magnitude envelopes are in quadrature. In the first place, the amplitude of this signal is most sensitive to rotor position, whilst secondly the amplitude varies substantially linearly with rotor position so that the amplitude gives a direct measure of the rotor position. The coils referred to may be the stator coils of a resolver having the rotor as part thereof, since then the signals produced in the coils vary in magnitude in a substantially sinusoidal manner on rotation of the rotor with the different magnitude envelopes phase shifted by 90° with respect to one another ready for the selecting means to make the selection of the smaller signal amplitude. On the other hand, the rotor may be part of a device having three stator coils which, on application of the datum signal to the rotor produce respective signals having magnitude envelopes phase shifted from one another by 120°. In this case the coils referred to are not these stator coils but are the output coils of a Scott-connected transformer (referred to for convenience as a Scott transformer) having three input coils connected to the respective stator coils to produce in the output coils signals having magnitude envelopes in quadrature.

The two conditions of each device may be conditions of stability, the devices thus being bi-stable devices. The coils may be arranged to control the three devices by acting through four bi-stable devices (referred to as intermediate devices, the other devices being referred to as main devices) one or other of which changes conditions for every 45° rotation of the rotor.

In a preferred arrangement, conductors are arranged to apply controlling signals to bring the selecting means and the intermediate bi-stable devices into operation at a predetermined point in the cycle of the datum input signal applied to the rotor. Thus, at this predetermined point in the cycle of the datum input signal the three main devices are brought into one or other of their eight possible conditions to represent the octant position of the rotor and the presenting means presents in digital form a result giving a measure of the rotor position within the octant. Such a result is presented once each cycle of the datum input signal.

A method according to the invention of producing electric signals representing the angular position of a rotor which, on application of a datum input alternating signal and in any selected angular position gives rise to alternating electric signals, which, on rotation of the rotor, vary in magnitude in a substantially sinusoidal manner with the different sinusoidal magnitude envelopes phase shifted with respect to one another comprises the steps of determining the octant of the rotor position by means of the alternating signals, producing electric signals in digital form representing the result of this determination, determining the rotor position to a higher degree of accuracy by measuring the smaller amplitude of two signals whose magnitude signals are in quadrature, and producing electric signals in digital form corresponding to this measurement.

A method and apparatus according to the invention will now be described, by way of example, with reference to the accompanying drawings in which:

FIGURE 1 shows at the bottom a Scott transformer ready for connection to a synchro at the top;

FIGURES 2(*a*) and (*b*) relate to wave forms associated with the Scott transformer;

FIGURES 3(*a*) and 3(*b*) are together a circuit diagram showing the way in which the outputs from two Scott transformers are arranged to control the output of the circuit to give an output which is a measure of the position of one or other of the rotors of two synchros;

Figure 3A:
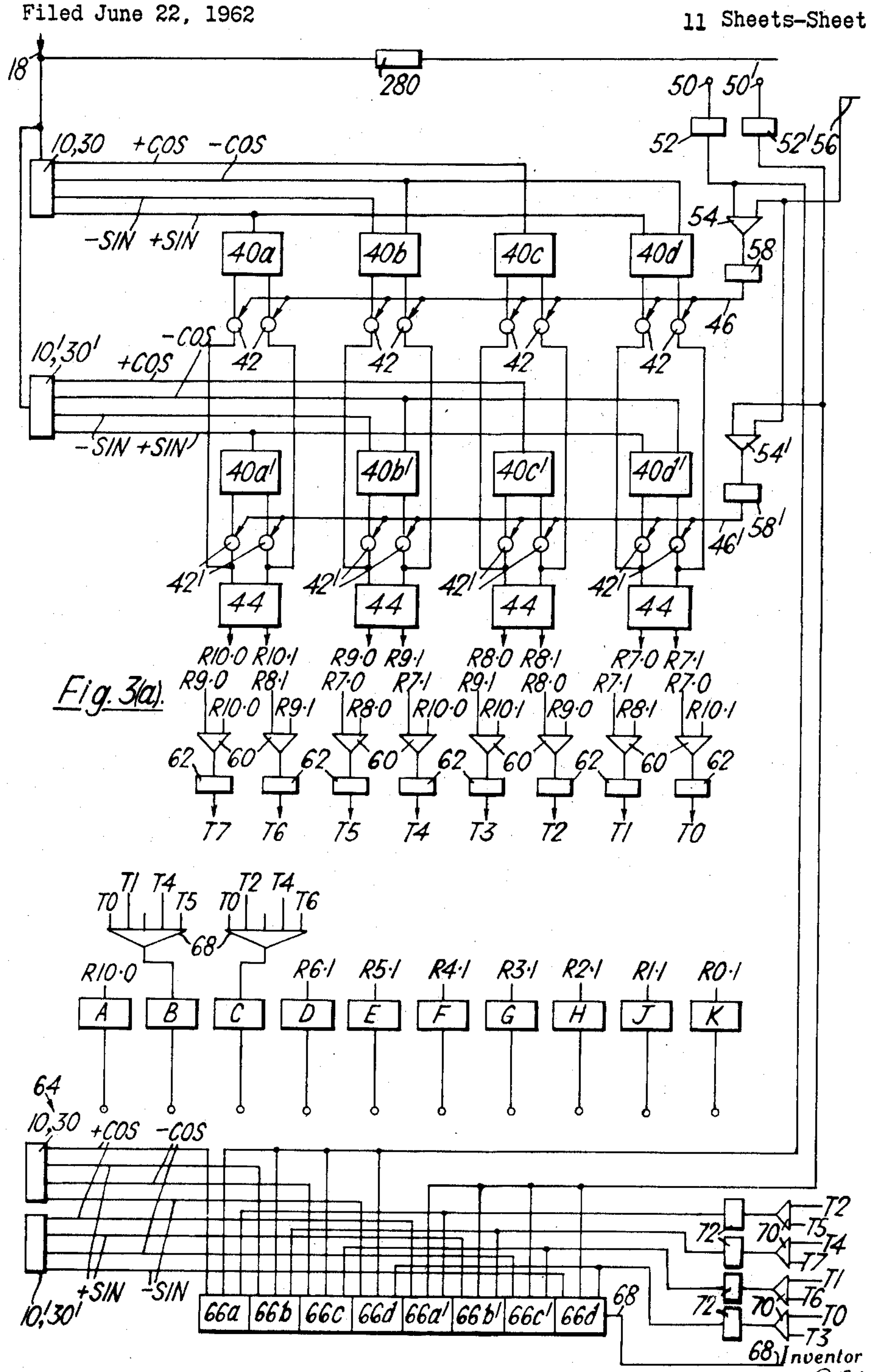
FIGURE 3(*c*) shows wave forms *a–p* associated with the circuit shown in FIGURE 3, corresponding points *a–c* and *h–p* being marked thereon (the points *d–g* being omitted for the sake of simplicity).
Figure 3B:
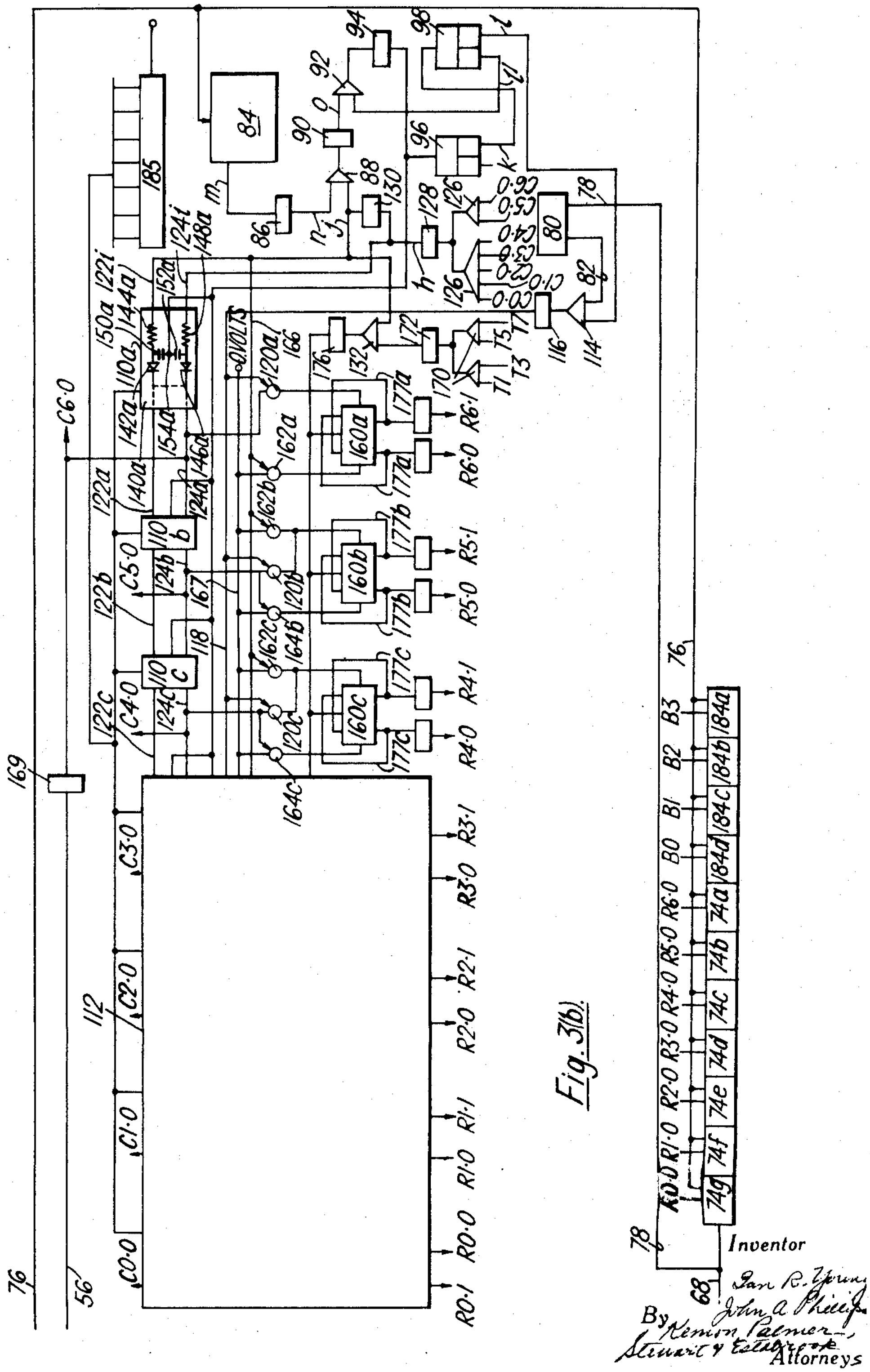
Figure 3C:
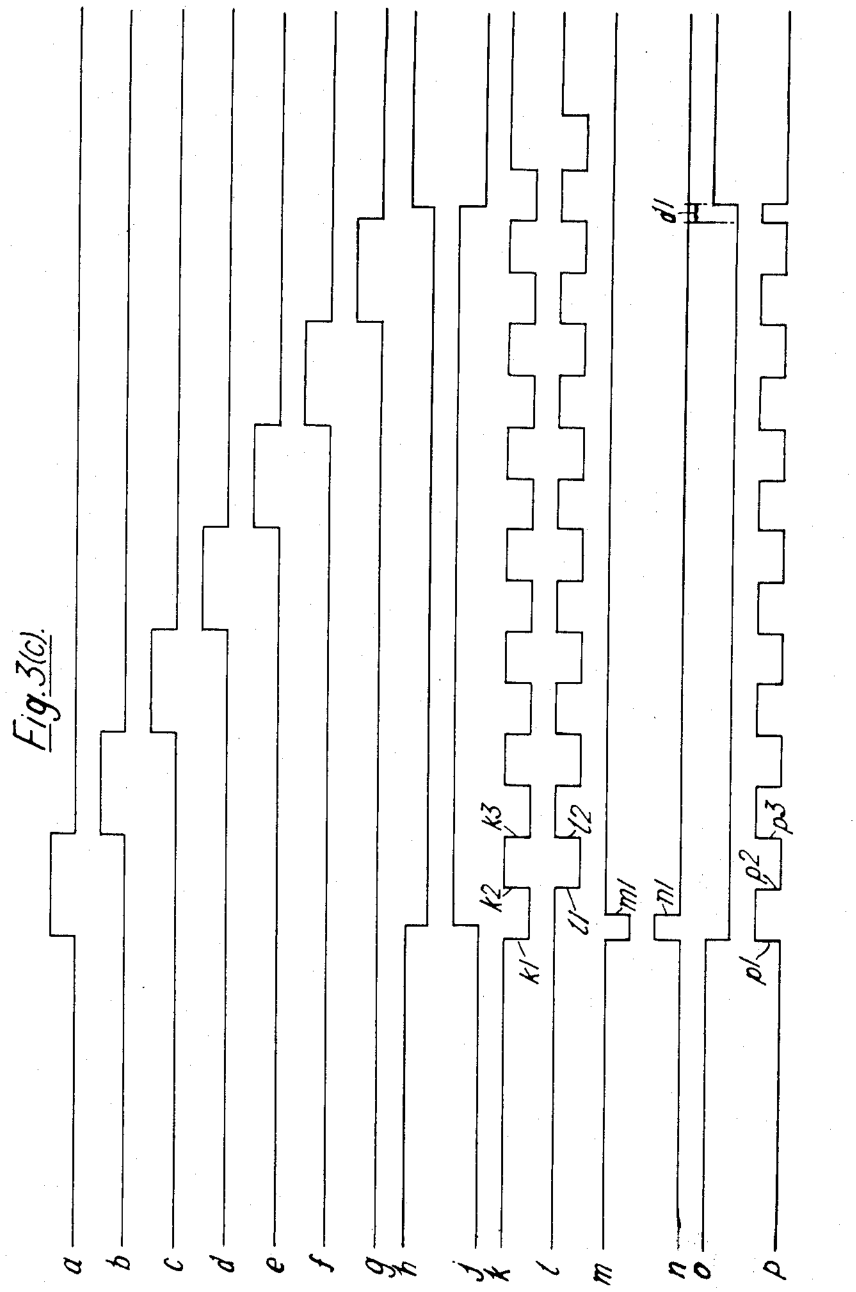
Figure 9B:
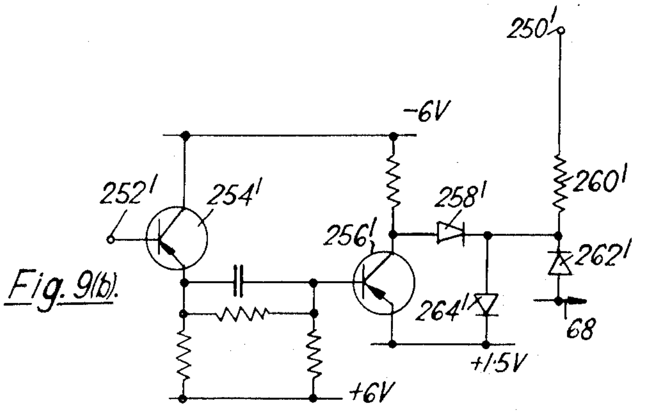
Figure 9A:
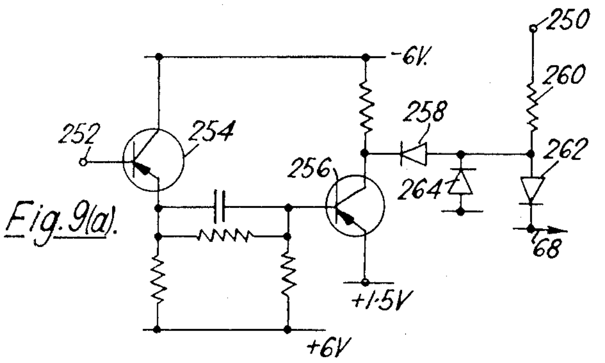
Figure 10:
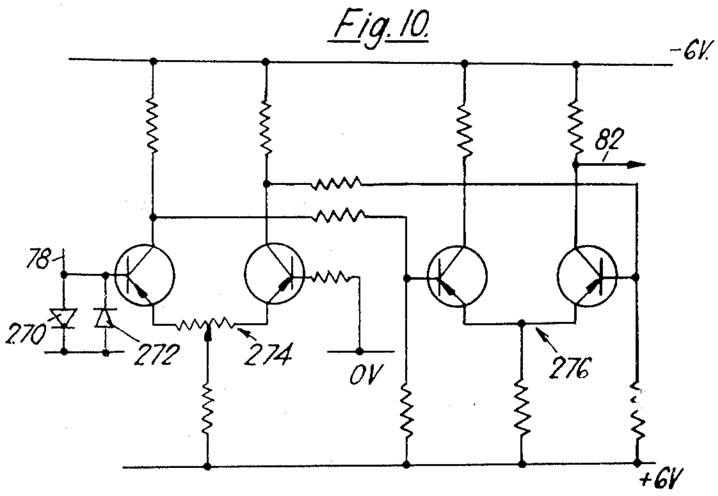
Figure 11:
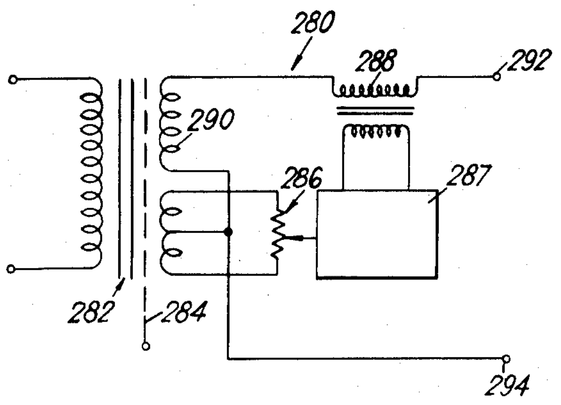

FIGURES 9(*a*), 9(*b*) are circuit diagrams of two sorts of switch employed in the circuit of FIGURE 3;

FIGURE 10 is a circuit diagram of a bridge amplifier employed in the circuit;

FIGURE 11 shows a phase correction circuit; and

Figure 12:
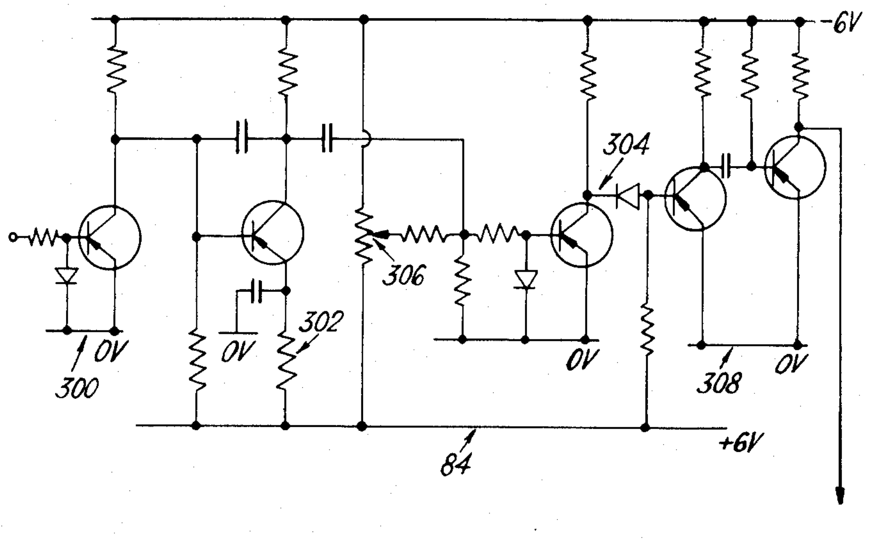

FIGURE 12 shows a timing circuit;

Referring first of all to FIGURE 1, a synchro 10 is shown which may be constructed as a magslip transmitter or as a synchro control transmitter has a rotor 12 and three associated stator windings **14*a*, 14*b*, 14*c*, spaced at 120° from one another. One end of the rotor 12, shown at 16, is earthed whilst the other end, shown at 18**, is fed with alternating signals which are here regarded as sinusoidal or sine waves.

When the rotor 12 is in a particular angular position the sinusoidal signals which are induced in the three stator windings 14 have a particular predetermined relationship to the sine wave applied to the end 18 (this sine wave being the datum input signal) and their amplitudes are fixed. Thus, when the rotor 12 is in what can be defined as the 0° position (shown diagrammatically in FIGURE 1) no signal is introduced in the winding **14*c* but signals of large amplitude are induced in the windings 14*a* and 14*b*, their amplitudes being represented by the lines 20 and 22** in FIGURE 2(*a*). The signal induced in the winding **14*a* is in phase with the datum input signal, whilst that induced in the winding 14*b* is out of phase with the datum input signal. If, now, the rotor 12 is turned the amplitudes of the three induced signals change sinusoidally as shown by the three lines 24*a*, 24*b* and 24*c* respectively. At the 60° position of the rotor 12 the polarity of the signal induced in the winding 14*b* with respect to the datum input signal changes over, as shown by the line 24*b* crossing the horizontal axis. Similar changes in polarity take place every 60°. It would be possible to employ these changing over points to locate the position of the rotor 12 to the nearest 60°, but in the present apparatus the octant in which the rotor lies is required in the first instance. It is for this reason that the synchro 10 is connected to a Scott transformer indicated at 30. This Scott transformer 30 has three input windings 32*a*, 32*b*, 32*c* connected to the windings 14*a*, 14*b* and 14*c* respectively. The Scott transformer has two output windings 34 and 36** which are earthed at their centre points and which at their outer ends provide sinusoidal signals which all have the same amplitude, the signal from one end of each output winding being in anti-phase with the output signal derived from the other end of that winding and in quadrature with an output signal from the other winding. The four output signals are best regarded as having envelopes in the form of positive and negative cosine waves and positive and negative sine waves respectively and these are shown in FIGURE 1.

FIGURE 2(*b*) relates to the output signals from the Scott transformer 30, the upward direction representing, as in FIGURE 2(*a*), signals which are in phase with the datum input signal, whilst the downward direction represents anti-phase signals. Thus, in rotor positions from 0° to 180° the + sine signal is in phase with the datum input signal, and its amplitude is given by the line **38*sp*. In rotor positions from 180° to 360°, the amplitude of the + sine signal is represented by the line 38′*sp*, a line of the same form as the line 38*sp*** but of opposite polarity, representing the fact that the + sine signal changes polarity with respect to the datum input signal at the 180° position.

The amplitude of the + cos signal is represented by a line **38*cp*, whilst the amplitudes of the − sine and − cos signals are represented by lines 38*sm* and 38*cm*** respectively. It can be seen from FIGURE 2(*b*) that there is a phase change with respect to the datum input signal in one or more of the four Scott transformer output signals for every 90° movement of the rotor. It will be seen shortly that the sine and cosine output signals from the Scott transformer are gated together in such a way as to provide a phase change for every 45° of rotor movement and such changes are then employed to determine the octant position of the rotor. In order to find the position of the rotor to a higher degree of accuracy than this the smaller amplitude is measured of two quadrature signals from the Scott transformer 30. As shown, the two signals selected for the first 90° are the − sine and − cosine, and other pairs of signals are selected for the other angles. The effective parts of the magnitude envelope of the selected signals are shown in full lines in FIGURE 2(*b*) and it can be seen that this envelope has a saw-tooth form where the separate edges making up the saw-tooth are substantially linear so that the amplitude of the selected signal from the transformer 30 is substantially proportional to the position in degrees of the rotor 12. As will be apparent later a correction is applied to avoid errors due to the departure of each edge from a straight line configuration.

Figure 5:
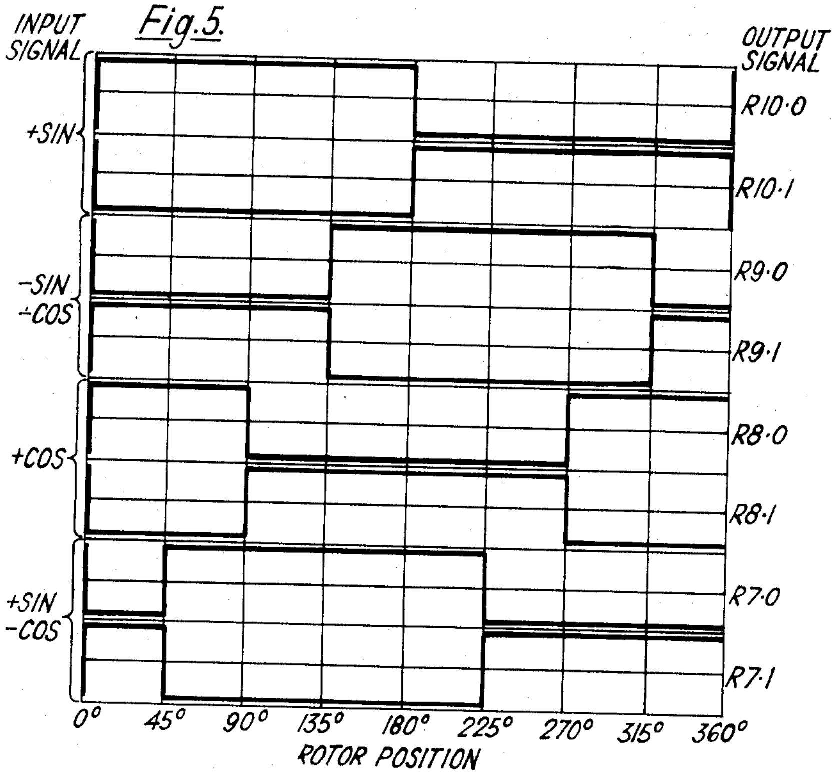
FIGURES 5 and 6 show the way in which polarities of various signals change with the position of the rotor of one of the synchros.

In order to determine the octant position of the rotor 12 output signals from the Scott transformer 30 are applied to four limiter amplifiers **40*a*, 40*b*, 40*c* and 40*d*** (see FIGURE 3(*a*)) which are described in more detail later. The amplifiers **40*a*, 40*c* receive the + sin and + cos signals respectively whilst the amplifiers 40*b* and 40*d* each have dual inputs, one having (− sin and − cos) the other (+ sin and − cos), these amplifiers having an output phased midway between the phases of the dual inputs. All the amplifiers have bi-phase outputs, so that eight output signals are obtained. The amplifiers have such a high sensitivity that an input signal corresponding to a few minutes rotation from a null or cross over point is sufficient to give a full ouput. Thus the eight outputs of the four amplifiers are represented by squarewaves, these being shown in FIGURE 5. The top two squarewaves represent the anti-phase outputs from the amplifier 40*a*, the next two squarewaves represent the outputs from the amplifier 40*b* and so on. Each amplifier 40 is connected through two gates 42 to a bi-stable circuit 44 which thus takes up one condition or the other depending upon the polarity of the output signal of the respective amplifier. The gates 42 are all opened simultaneously by a signal applied through a line 46 once for each cycle of the datum input signal, the signal being applied near the negative peak of this datum input signal, so that the outputs of the bi-stable circuits 44 represent the polarities of the eight signals derived from the amplifiers at a particular fixed time in each cycle of the datum input signal. The lines in FIGURE 5 thus represent the conditions of the four bi-stable circuits 44. It can be seen that one circuit 44** changes condition every 45° of rotor movement.

The circuit illustrated can readily cope with more than one synchro and as illustrated two synchros are provided. The second one is identical with the first and is associated with identical parts, all the different parts being represented by the same reference numerals but primed. The bi-stable circuits 44 are common to the two synchros and associated parts and may be controlled alternately by signals from the two synchros or in any desired sequence. In order to bring the first synchro into effective operation, a signal is applied through an input 50 and amplifier 52 to a gate 54 which, near the negative peak of the datum input signal receives a signal via a line 56 and thereby applies a signal to an amplifier 58 and the line 46 to open all the gates 42. If the second synchro is to be brought into operation, no signal is applied to the input 50, so that all the gates 42 remain closed, and the gates 42' then are opened by applying a signal to an input 50', this signal acting in the same way as the one applied previously to the input 50.

Figure 6:
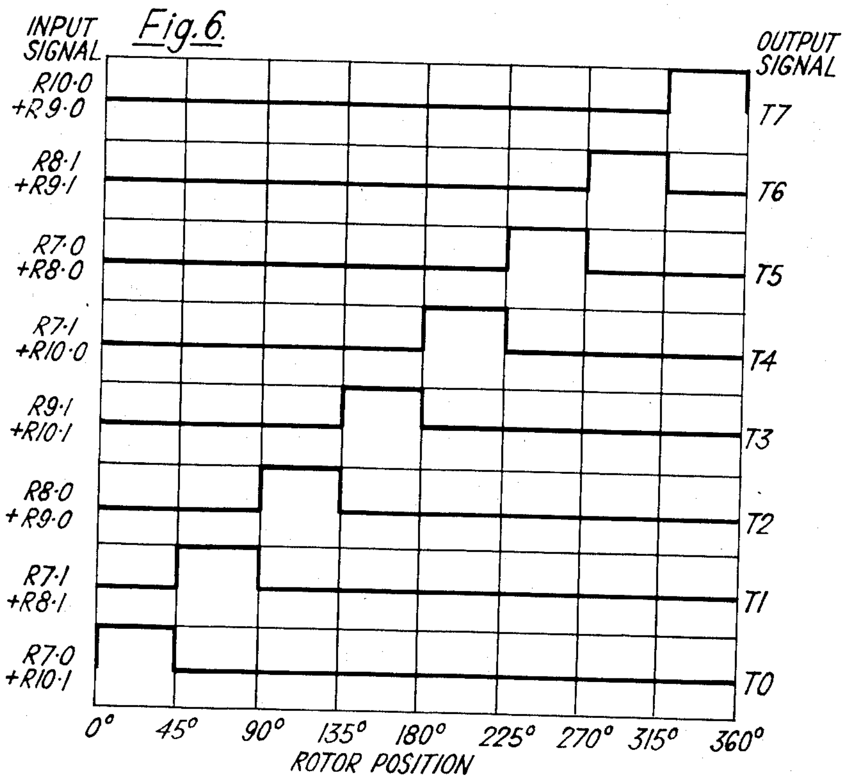

The output signals from the circuits 44 are gated together in the manner shown in FIGURE 3(*a*) by AND gates 60 and the resultant signals are applied to amplifiers 62 and the resultant outputs are shown as T0, T1, . . . T7. It can readily be seen that these signals T0–T7 are the ones shown in FIGURE 6. Taking, for example, the left hand gate 60 which is supplied with the signals R9.0 and R10.0, a positive signal T7 is obtained only when R9.0 and R10.0 are both negative and this occurs (see FIGURE 5) only when the rotor is in a position between 315° and 360°, as shown by the squarewave 64 in FIGURE 6.

The signals T0–T7 are in turn gated together at OR gates 68 in the manner shown in FIGURE 3(*a*) and the resultant pair of signals obtained by this gating are applied to respective similar devices B and C, a third similar device A receiving the signal R10.0. Each of these devices A, B and C, is in the form of an amplifier like the amplifiers 40, each device thus having two conditions giving no output and full output respectively the three devices together having eight conditions. (These devices could, if desired, be bi-stable devices if suitable means for re-setting then were provided.) It can be seen from FIGURE 5 that the device A has one condition for rotor positions between 0° and 180° and its other condition for 180° to 360°. The device B has one condition whenever there is a positive signal T0, T1, T4 or T5 and its other condition when there is a signal T2, T3, T6 or T7. It follows from FIGURE 6 that the device B has its first condition for rotor positions between 0° and 90° and between 180° and 270°, and has the second condition for other rotor positions. The device C has one condition when there is a positive signal T0, T2, T4 or T6 and its other condition for other positive signals. It can be seen from FIGURE 6, therefore, that the device C changes condition for every 45° movement of the rotor. The devices A, B and C have, therefore, as previously mentioned between them eight different conditions, and these represent the eight octants in which the rotor can lie.

The devices A, B and C may if desired be merely amplifiers able to give appropriate output signals but they may, if desired, be connected to respective visual indicators to give individual indications of the octant position of the rotor.

In order to determine the rotor position to a higher degree of accuracy (in this particular case to 45/128 degrees) it is necessary to measure the amplitude of a selected one of the four outputs of the Scott transformer 30. This selection is made by the switching arrangement 64. This switching arrangement 64 includes four switches **66*a*, 66*b*, 66*c* and 66*d* for controlling sinusoidal signals derived from the transformer 30, and similar switches 66*a'*, 66*b'*, 66*c'* and 66*d'* for controlling sinusoidal signals derived from the transformer 30'. All these switches are identical, and the circuit diagram of one of them will be described in more detail later. When a given switch, say the switch 66*a*, is open the corresponding applied sinusoidal signal, in the case + cos, appears at a common output line 68 of the switches 66. The opening of each switch depends upon two separate inputs, the first input being that applied at 50 or 50', depending upon which of the transformers, 30 or 30' is to be operative, whilst the second input, which is added to the first prior to application to the actual switch 66 is derived from a gated combination of the signals T0**–T7. These signals are gated together in the manner shown in FIGURE 3(*a*) by means of or gates 70 connected to amplifiers 72 which in turn are connected to the switches as shown. In the first octant, T0 is the only signal obtained (see FIGURE 6) and the only switches which can be opened are therefore the switches **66*d* and 66*d'*. If the signal has been applied at the terminal 50 to bring the transformers 10, 30 into operation the switch 66*d* will be the one which is opened and as a consequence the — sin signal appears at the line 68. In the next octant, only T1 appears and this opens the switch 66*c* so that the — cos signal appears at the line 68**. The switching operation thus serves to select that signal whose magnitude envelope is shown in full lines in FIGURE 2(*b*). Having selected the signal, its amplitude must now be measured and this is done by comparing the signal in turn with current which is allowed to pass through selected ones of seven different weighted parallel resistors (not shown but referred to for convenience as comparator resistors) which are in series with respective switches **74*a*–74*g*** (see FIGURE 3(*b*). This comparison technique is of a conventional nature and involves first passing current through the smallest comparator resistor of the set and comparing this with the signal at the line 68. If the latter signal is smaller than the former current the respective switch 74 is opened and the next one, in series with the next comparator resistor which is double the size of the first, is closed to provide half the previous current. This current is again compared with the signal at the line 68 and the previous process repeated if the latter signal is still smaller than the current. If the signal is larger, then the appropriate switch 74 is kept closed and the next switch is also closed. Each comparator resistor brought into play is double the previous one so that each takes half the current taken by the previous one. The current passing through the seven different comparator resistors can thus have any one of 128 different sizes, and each of these corresponds to one of 128 different rotor positions in an octant.

In the circuit shown in FIGURE 3(*b*), the current applied to the different comparator resistors is applied to the switches 74 through a line 76 which itself is fed directly from the same source which feeds the end 18 of the rotor 12. A signal representing the difference between the signal at the line 68 and the current allowed through the selected comparator resistors controlled by the switches 74 is applied through a line 78, to a difference amplifier 80 which provides at a line 82 an output whose polarity depends on whether the signal at the line 68 is greater or smaller than the current conducted by the comparator resistors. Before describing the way in which the signal at the line 82 acts, it is necessary to describe the operation of most of the remainder of the electrical circuit shown in FIGURE 3(*b*).

This circuit includes a timing circuit 84 which, like the switches 74, is fed with the datum input signal. This timing circuit 84, which will be described in more detail later, provides at a negative peak of this input signal a negative pulse (shown at *m*1 in FIGURE 3(*c*)) which is inverted and amplified by an inverter amplifier 86 to produce a positive pulse shown at *n*1 in FIGURE 3(*c*), this being applied through a gate 88 to a further inverter amplifier 90 to provide the negative going edge *o*1 of a square-wave *o* (FIGURE 3(*c*)) which is applied through a further gate 92 and inverter amplifier 94 to create a positive going edge *p*1 for a wave *p*. This edge *p*1 is applied to a mono stable circuit 96 which is thereby switched into an unstable condition. When it does so a negative going edge *k*1 of a wave *k* is applied by the mono stable circuit 96 to the input of a second mono stable circuit 98 which, however, is only sensitive to positive going edges. At some predetermined time later, the mono stable circuit 96 reverts to its original condition and in doing so creates a positive going edge *k*2 at the output, which, on application to the mono stable circuit 98 causes the latter to turn to its unstable position and create a negative going edge *l*1 at one of its outputs, and a positive going edge (not shown) at its other output, shown at 1'. This positive going edge is applied to the gate 92 and amplifier 94 to create a negative going edge *p*2 which does not affect the circuit 96. A predetermined time later, the circuit 98 reverts to its original condition to produce a positive going edge 12, and a corresponding negative-going edge at its output 1', which is applied to the gate 92 and amplifier 94 to provide a positive going edge *p*3 which acts to switch the circuit 96 to its unstable condition producing a negative going edge *k*3. All this is repeated thereby producing at *p* and *l* square waves, with the one at *p* starting first. As will appear later, the positive parts of the wave *p* and the negative parts of the wave *l* are effective so that these two waves are in effect out of phase with one another.

As will be explained in detail, later, for each pulse applied by the timing circuit 84 to the amplifier 86 the circuits 96 and 98 each go through a cycle of eight complete operations so that eight positive going pulses *p* are produced and eight staggered or intermediate negative-going pulses *l* are produced.

The positive going pulses *p* are applied, as shift pulses, to a shift register made up of seven bi-stable circuits of which three are shown at 110*a*, 110*b*, and 110*c*, the remainder being conducted in exactly the same way within a box shown at 112. The negative pulses *l* are applied to a gate 114 which is opened or closed by the amplifier 80 depending upon whether the signal at the line 68 is smaller or greater than the current passing through the comparator resistors selected by the switches 74. If, therefore, the signal is smaller than this current the gate 114 is opened and a pulse *l* is allowed through to an inverter amplifier 116 and a resultant pulse is then applied to a line 118, connected to seven gates of which three are shown at 120*a*, 120*b*, 120*c*, the other four gates being connected in the same way as the gates 120*b*, 120*c* within the box 112. Whether or not one of these gates is opened or closed depends upon the condition of the respective bi-stable circuit 110. At the beginning of a complete cycle of operation (that is to say one cycle of the datum input signal) each bi-stable circuit 110 is in one condition (which can be specified as the condition "0" the other condition being specified as "1"). In the "1" condition the output at a line 122*a*, 122*b*, 122*c* and so on is negative and the output at a line 124*a*, 124*b*, 124*c*, and so on is positive, while in the "0" condition these polarities are reversed. Thus at the beginning of a cycle of operation signals C6.0–C0.0 taken from the lines 122*a*–122*g* respectively are all negative. These signals are applied to gates 126 connected to an amplifier 128 connected to an inverter amplifier 130. The output of the latter (shown at *j* in FIGURE 3(c)) is applied to a gate 132, this gate being opened whenever all the signals C6.0–C0.0 are negative but otherwise closed. The anti-phase outputs of the amplifier 128 and 130 (shown as *h* and *j* in FIGURE 3(*c*)) are applied as the input to the circuit 110*a*, the polarities being such as to feed into this circuit 110*a* a "1" condition when all the signals C6.0–C0.0 are negative, but otherwise to feed in an "0" condition.

The feeding in of such conditions can be explained with reference to the circuit 110*a* (all the other circuits 110 being the same) which includes a flip flop 140*a* having as the output lines the lines 122*a* and 124*a* and having two input lines, one having a rectifying diode 142*a* and a resistor 144*a* in series whilst the other has a rectifying diode 146*a* and a resistor 148*a* in series. The cathode of the diodes 142*a* and 146*a* are substantially at earth and they can be rendered conducting therefore only by the application of a positive pulse to the anodes. Connected across the two input lines are a pair of capacitors 150*a* and 152*a* having a junction 154*a* to which the shift signal *p* is applied. When the circuit 110*a* is in the "0" condition and all the signals C6.0–C0.0 are negative, thereby producing negative and positive signals respectively at the input lines 122*i* and 124*i*, the application to the junction 154*a* of the shift pulse *p* causes the application to the anode of the diode 146*a* of a pulse which causes the diode to conduct to turn the flip flop 140*a* from its "0" to its "1" condition, no pulse passing through the rectifier 142*a* since its anode is held at a negative potential by the input applied to the line 122*i*. No change takes place in the circuit 110*b* or the later ones since the shift signal *p* is applied to the respective flip flop 140 through the respective diode 142 and this serves to keep the flip flop 140 in its original condition.

When the next pulse *p* is applied to the circuits 110, the circuit 110*b* is turned from its "0" to its "1" condition. At the same time, the circuit 110*a* is turned from its "1" condition to its "0" condition since this circuit is now provided with an input through the lines 122*i* and 124*i* corresponding to an "0" condition, since one of the signals C6.0–C0.0 is now positive (actually the signal C6.0, shown at *a* in FIGURE 3 (*c*)). Thus, as the circuit 110*b* is being switched from its "0" condition to its "1" condition, the circuit 110*a* is being switched form its "1" condition to its "0" condition. This latter switching action would tend to prevent the switching action of the circuit 110*b* but this is prevented by introducing a time delay by means of the capacitors and resistors in the circuit 110*a*.

The next pulse *p* shifts the "1" condition to the circuit 110*c* and so on, the eighth pulse *p* finally converting the seventh circuit 110 to the "0" condition. This causes an inversion of the signal applied across the lines 122*i* and 124*i* (ready to feed a "1" condition into the circuit 110*a* at the beginning of the next cycle) and also causes the application to the gate 88 of a signal which closes the gate 92 so that the mono stable circuits 96 and 98 end their switching operations, the circuit 98 stopping after producing its eighth negative pulse. It will be appreciated that all the individual constituent circuits—flip flops etc.—have an inherent delay and because of this the inverter 94, the flip flop 110*g*, the inverters 128 and 130 and the gate 90 produce a delay shown at *d*1 in FIGURE 3(*c*), this delay being sufficient to cause the production of the eighth pulse *p*, returning the shift register to its initial condition. Other delays occur, of course, but these are unimportant and no attempt has been made to show them in FIGURE 3(*c*).

The circuits 110 are connected to control respective bi-stable circuits 160, three being shown at 160*a*, 160*b*, 160*c* and the rest being identical and disposed within the box 112. Each circuit 160 is like the circuit 110*a*. Each of the circuits 160*b*, 160*c* etc. is controlled by a respective set of three gates 120, 162, and 164 whilst the first circuit 160*a* is controlled by only two, shown at 120*a* and 162*a*. The gates 162 are the first to operate during a complete cycle of the datum input signal, for when the signal *j* becomes positive and is applied through a line 166 to all the gates 162, these are all opened by virtue of an earth potential applied through a line 167. The signal *j* acts to put the circuit 160*a* into an "on" condition and all the other circuits 160 into "off" conditions. Each of the circuits 160 has two outputs, shown as R6.0, R6.1; . . . R0.0, R0.1. The outputs R0.0, R1.0 . . . R6.0 are employed to control corresponding switches 74*a*–74*g*, so that with the circuit 160*a* alone in the "on" condition, the switch 74*a* is closed and all the others 74*b*–74*g* are open. The signal appearing at the line 68 is thus compared with current allowed through the comparator resistor in series with the switch 74*a*, the signal referred to appearing at the line 68 by virtue of the application through the line 56 of an appropriate signal from the line 124*a*, inverted by an inverter 169.

If the signal at the line 68 is smaller than the current through the comparator resistor a pulse *l* is allowed through the gate 114 and is applied to the line 118. Of the gates 120, the only one open at any particular time is the one connected to the circuit 110 in the "1" condition. The pulse referred to can therefore pass through only the gate 120*a* since only this gate is open. This pulse serves to switch the circuit 160*a* off and open the respective switch 74*a*. This circuit 160*a* is left in the "on" condition if the signal at the line 68 is greater than the current passing through the comparator resistor, since with this condition no pulse *l* is allowed through the gate 114 by the amplifier 80.

After the second pulse *p*, the circuit 110*b* takes up its "1" condition and as a result a positive signal is applied to the gate 164*b* which is open because of the earthed line 167. The signal is thus applied to the circuit 160*b* and turns this circuit on. The switch 74*b* is thus closed and a further comparison made as a result of which the circuit 160*b* is either switched off or allowed to remain in its new condition. The appropriate decision about this is made by the amplifier 80 which acts on the gate 114 so that the latter either allows through the second pulse *l*, or stops this pulse. Later still a third pulse *p* is applied to the junctions 154 in the various circuits 110, and the "1" condition is then transferred from the circuit 110*b* to the circuit 110*c*. This whole process is repeated until, at the last operation, the seventh circuit 110 changes from its "1" to "0" condition. When this happens all the circuits 110 are in an "0" condition as they were originally.

At the end of a complete cycle of operation the particular one of the 128 possible states of the seven circuits 160 represents the magnitude of the signal appearing at the line 68 and thus represents the angular position of the rotor 12 within its octant. This representation is a binary one owing to the weighting of the comparator resistors in series with the switches 74. The signals R0.1, R1.1 . . . R6.1 thus represent in digital form the angular position of the rotor within the particular octant of rotor position and these signals are applied to devices D, E, F, G, H, J and K which are similar to the devices A, B, C (i.e. each has two conditions, and may be connected to a respective visual indicator) and which present in digital form a result indicating the rotor position. All the devices A–K together thus give in binary form the position of the rotor to within 45/128 degrees.

It will be appreciated that the circuits 110 and 160 and the associated gates 120, 162 and 164 constitute an analogue-to-digital converter.

Referring now to FIGURE 2(*b*) it can be seen that as the rotor 12 is turned from 0° to 45° the magnitude of the corresponding signal at the line 68 increases in a substantially linear manner and as the rotor 12 turns through the next 45° the magnitude decreases. Because of this it is necessary to invert the conditions of all the circuits 160 before the applications of the respective signals to the devices D–K, and such inversion is also required in the fourth, sixth and eighth octants. Such inversion is brought about by gating the signals T1, T3, T5 and T7 at or gates 170 so that whenever one of these signals is obtained an appropriate signal is applied through an inverter amplifier 172, the gate 132 (opened as the signal *j* goes negative) and an inverter amplifier 176 to all the circuits 160 to invert them, such inversion being possible by virtue of connections 177 between the output and the input of each circuit 160. Before the inverting signal is applied the devices D–K show an incorrect result, but this lasts for an insignificant length of time, since the total time for the occurrence of all the signals shown in FIGURE 3(*c*) is small compared with a complete period of the datum input signal.

Figure 7:
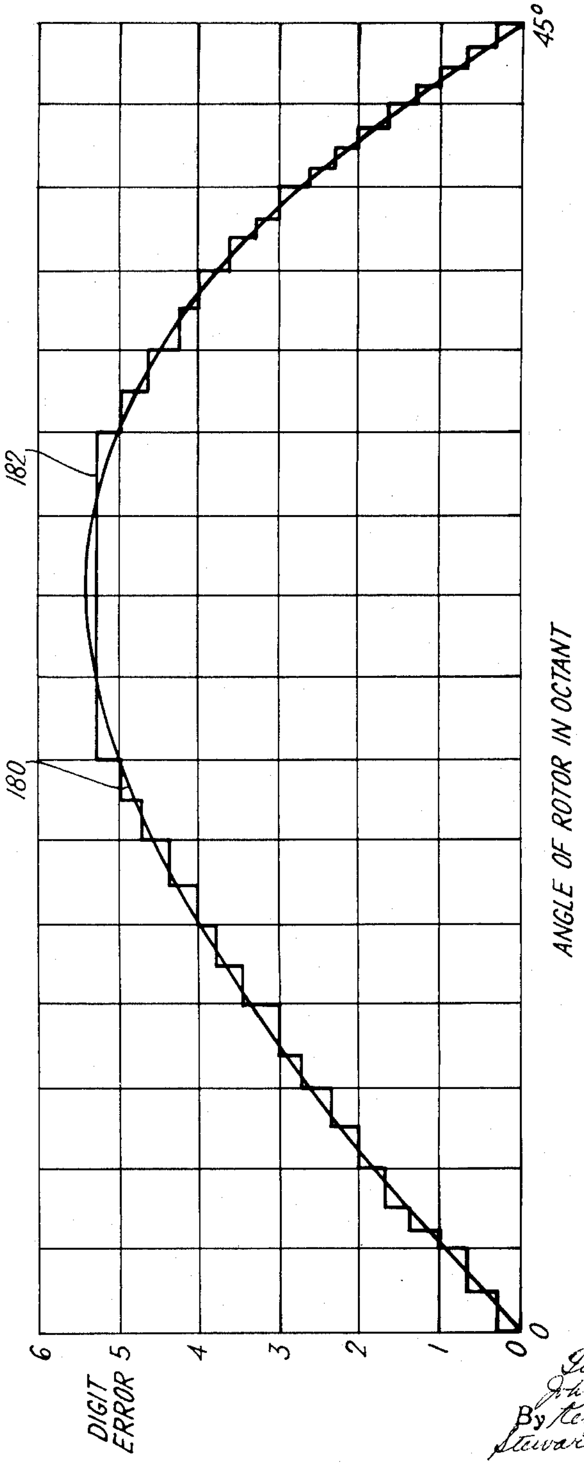
FIGURE 7 is a graph showing a correction which is applied to the output.

If the comparison effected with the aid of the switches 74 were effected exactly as previously described the results appearing at the devices D–K would not be as accurate as is sometimes desirable owing to the departure of the full line parts of the curve in FIGURE 2(*b*) from a strict linear form. Such departures can be clearly seen from FIGURE 7 which show the way in which the digit error which would appear at the devices *D–K* varies as the rotor moves from a 0° to a 45° position, the smooth line 180 showing this variation. It can be seen that the results given at the devices D–K would be strictly accurate at 0° and 45° but would be incorrect by about 5 digits at about 27°. In order to avoid such errors, an appropriate correction is made, the correction being shown by the step line 182. The correction is brought about by comparing the signal at the line 68 with a current which has been corrected in accordance with the line 182. This current is the sum of two further currents, the first of which is the sum of the currents flowing through the individual comparator resistors (not shown) in series with the closed switches 74 whilst the second current (being referred to as the correction current) is the sum of currents flowing through further resistors (not shown) arranged in parallel, each being in series with the respective switch 184 (FIGURE 3). These switches are opened and closed in response to signals shown at B0, B1, B2 and B3. These signals are produced by gating arrangements which are shown fully in FIGURE 4.

Figure 4:
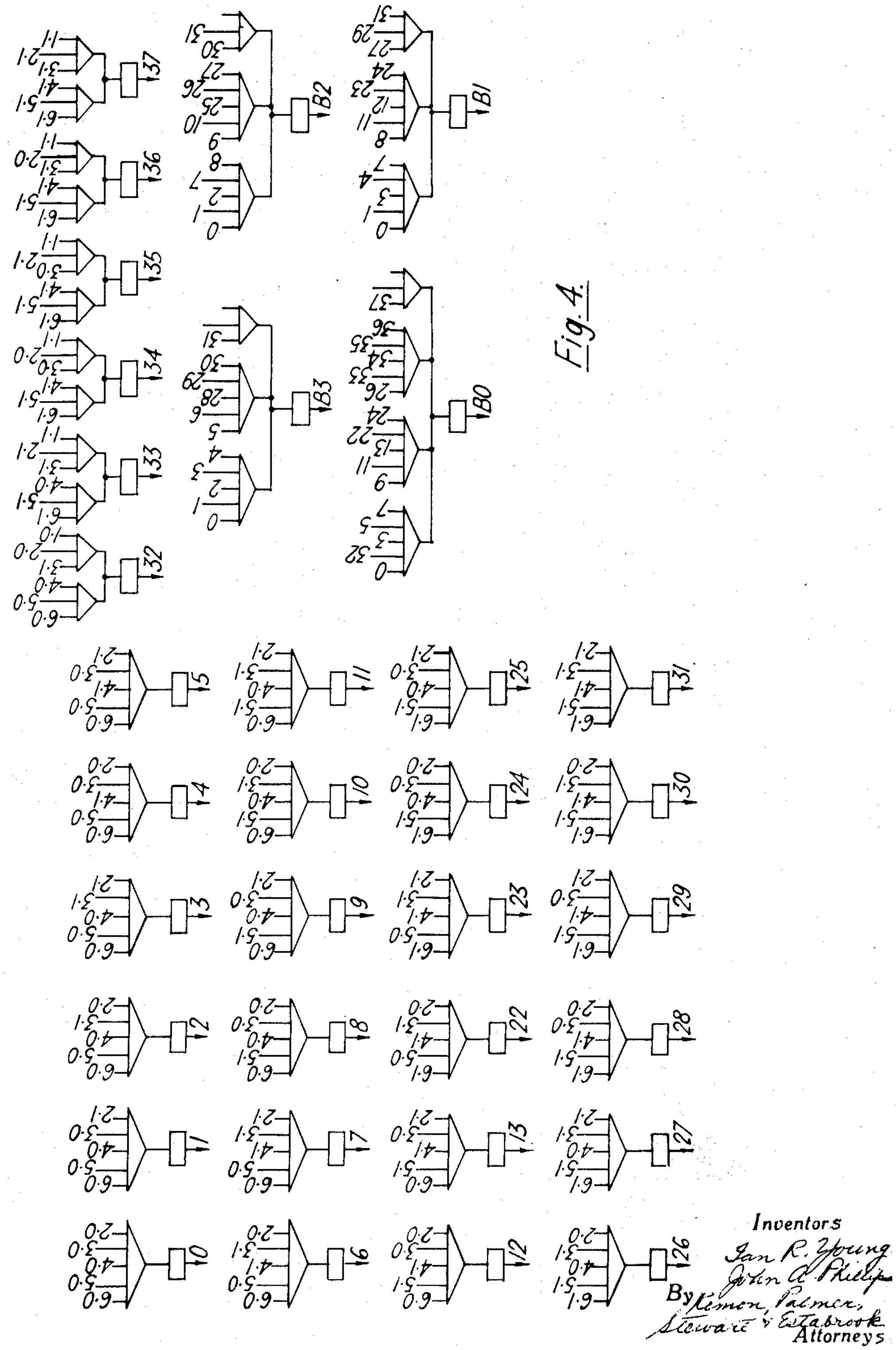
FIGURE 4 shows gating connections employed in the circuit diagram of FIGURE 3.

As can be seen from FIGURE 4, signals from the circuits 160*a*–160*f* are gated together in thirty different ways to produce signals 0–13 and 22–37 which in turn are gated together as illustrated to produce the signals B0–B3. Gating together of the different signals is such that the particular combination of switches 184 which are closed by the signals B0–B3 creates a correction current which is the equivalent of the step line 182. It will be appreciated that there are sixteen different possible combinations of the four switches 184 and sixteen different possible correction signals are thus possible. This corresponds to the sixteen different levels of the steps of the line 182.

A clamp circuit 185 is fed with the datum input signal and acts, during the positive half cycle, to turn all the circuits 110 into the "0" condition (if they are not already in this condition). Such a clamping action is necessary because, in its absence, in the event of a circuit 110 becoming stuck in a "1" condition the signal *j* applied to the gate 88 would close it to pulses from the timer 84, so that the whole circuit would remain inoperative. A circuit 110 could become stuck in the event of a power supply disturbance, causing the circuits 96 and 98 to fail to trigger one another alternately.

Figure 8:
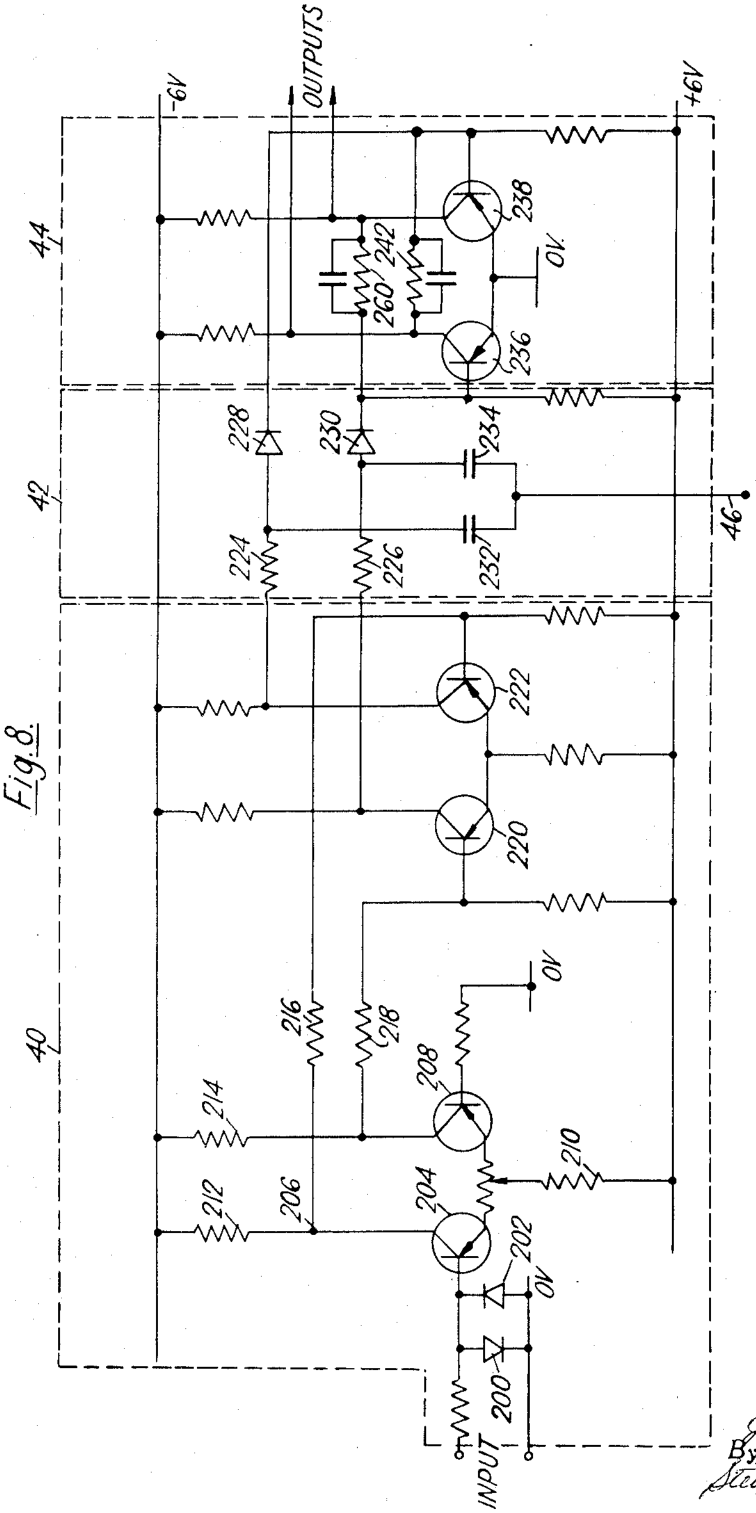
FIGURE 8 is a circuit diagram showing in detail parts of the circuit shown in FIGURE 3.

The remaining figures show circuit details. FIGURE 8, for example, shows the circuit diagram of any one of the amplifiers 40, its associated gate 42 and bi-stable circuit 44. The amplifier 40 has at its input two diodes 200, 202 connected between the base of a transistor 204 and earth to bypass the major part of any sinusoidal signal. The transistor 204 acts, indeed, to move from one extreme condition to the other in response to a small applied signal at the base so that on application of a sinusoidal signal at the base an output of squarewave form is obtained at the collector 206. The first stage of the amplifier 40 is constructed as a phase splitter, having a second transistor 208, the transistors having a common emitter resistor 210 and separate collector loads 212 and 214. The anti-phase outputs are applied through resistors 216 and 218 to the bases of two transistors 220 and 222 constituting the second stage of the amplifier. The amplified signals are applied through respective gates 42 having resistors 224 and 226, respective rectifiers 228 and 230 and capacitors 232 and 234 connected to the line 46 previously mentioned. It is only when the positive pulse from the line 46 is applied to the gate circuits that the positive one of the two amplified signals can pass through to the bi-stable circuit 44. This bi-stable circuit 44 includes two transistors 236 and 238 having their emitters earthed and their bases and collectors coupled together through respective resistor capacitor networks 240, 242. The anti-phase output signals are taken off from the collectors of the two transistors.

FIGURE 9(*a*) shows the circuit diagram of each of the switches 66. The signals from the Scott transformer 30 are applied to the switch at a terminal 250, whilst the signals from the amplifiers 52 and 72 are first combined and then applied at a terminal 252. These latter signals are amplified by a transistor 254 and the resultant signal applied to the base of a further transistor 256 which amplifies the signal further and which has its emitter at +1.5 volts. The collector of the transistor 256 is connected through a diode 258 to the junction between a resistor 260 and a diode 262 which is connected in series between the input 250 and the line 68, and a further diode 264 is connected between the diode 258 and earth. During the negative part of the signal from the Scott transformer, the signal is bypassed to earth by the diode 264 but during the positive parts of the signal, the signal is able to pass to the line 68 but may as an alternative be bypassed through the diode 258, depending upon the voltage at the collector of the transistor 256. Prior to the application of signals to the amplifier 52 and 72 this potential is such that the signal applied to the terminal 250 is bypassed by the diode 258 and no output is obtained at the line 68. When, however, a signal is applied to the amplifiers 52 and 72 the signal at the terminal 250 passes through to the output line 68 for comparison purposes.

The amplitude of the signal applied to the terminal 250 is not fixed and a special method of compensating for the forward voltage of the diode 262 must be made when this is significant, employing two further coils 34′ and 36′ on the Scott transformer (see FIGURE 1). These coils produce − sin, + sin, − cos and + cos signals just like the associated coils 34, 36 but whereas these coils are centre-tapped at earth, the coils 34′, 36′ have their centre points connected to a potential divider 37 to receive − potential of 0.5 volt. The signals derived from the coils 34′, 36′ are thus related to this potential, and it is these signals and not the ones from the coils 34, 36 which are applied respectively to the four terminals 250 of the four switches 66*a*–66*d* (and 66*a*′–66*d*′), this potential of 0.5 volt serving as compensation for the forward voltage of the diodes 262. The signals from the coils 34, 36 are the ones applied to the amplifiers 40 for determination of the rotor octant. It is important that the switches 66 should not materially alter the current flowing through them when the switches are closed. Their action should, in fact, simply be to direct the current from the appropriate terminal 250 to the line 68. A minimum disturbance should be experienced by the Scott transformer during the switching action. The specification for the diode 262 is quite stringent. The forward voltage should be as low as possible and in addition the reverse current should be small because there will be, under certain conditions, several such diodes providing parallel leakage paths. Finally, the diode should have a rapid recovery time to enable a quick comparison to be made between the signal at the line 68 and the current flowing through the comparator resistors controlled by the switches 74 and 184.

The switches 74 and 184 are similar to the switches 66 but operate on negative going parts of a sinusoidal input. The circuit diagram of the switch is shown in FIGURE 9(*b*). This switch is the same as the switch shown in FIGURE 9(*a*) except that the diodes 258, 262 and 264 are the opposite way round, and all the components are, therefore, given the same reference numerals but primed and except that the diode 264′ is connected to a +1.5 volt supply. The signal applied to the terminal 252′ is the appropriate one of the signals R0.0–R6.0, B0–B3, whilst the terminal 250′ is fed with the datum input signal through the line 76. Negative going parts of this signal are allowed to pass through the diode 262′ and the appropriate comparator resistor (not shown), which determines the size of the current permitted through.

The amplifier 80 is shown in detail in FIGURE 10. The input, like that of the amplifiers 40 has two diodes 270 and 272 arranged in opposite directions to bypass excessively large currents. The comparator has two amplifying stages 274 and 276 and its output is applied to the line 82 to the gate 114.

It will be appreciated that it is important that the bringing into operation of the appropriate switches 74, and 184 should be at the correct time in the cycle of the datum output signal. Different synchros introduce different comparative small phase changes, so that with one synchro the phase of the signals obtained at the windings 34, 36, 34′, 36′ (see FIGURE 1) with respect to the datum input signal at the rotor 12 differs from that in a different type of synchro. In order to provide compensation for this a phase correction circuit 280 (see FIGURE 3(*a*)) is provided in the line 76 to enable the phase of the signal applied to the switches 74, 184 to be shifted with respect to that of the datum input signal. The phase correction circuit 280 is shown in detail in FIGURE 11 and includes a transformer 282 having an input winding fed with the datum input signal and also having output windings separated from the primary winding by an isolation screen 284. One output winding is connected across a potentiometer 286 feeding a Miller integrater 287 which introduces a 90° phase shift which is applied to a winding 288 in series with the other output winding 290 of the transformer 282. In this way a 90° phase shifted signal is added to the signal induced in the winding 290 and the phase of an output signal derived from terminals 292 and 294 will be shifted with respect to that of the winding 290. The degree of shift can be adjusted by means of the potentiometer 286. The output signal from the terminals 292 and 294 is applied to control the switches 74 and 184 through the line 76 and is also applied to the timing circuit 84 which is shown in more detail in FIGURE 12.

The phase shifted signal from the circuit 280 is applied to the input of a limiter stage 300 of the timing circuit 84, this limiter stage amplifying the reference voltage and limiting the sine wave to produce a square-wave. This is integrated by the next stage 302 and the resultant sawtooth wave is applied to a further limiter 304 which is also fed with a D.C. signal derived from a timing control potentiometer 306. The limiter 304 produces a squarewave the position of whose transitions depend on the adjustment of the potentiometer 306. The positive going edge of the wave is differentiated and amplified by the next stage 308 of the circuit to produce a pulse of approximately 5 micro seconds duration, this being the pulse which is applied to the amplifier 86 to initiate a cycle of operation. The potentiometer 306 may be adjusted to vary the pulse to 60° on either side of the negative peak of the datum input signal. This adjustment is made to minimise the effect of the harmonic content of the signals derived from the synchro 10 on the accuracy of the octant determination and octant sub-division, such harmonics are introduced naturally by the synchro.

We claim:

1. In a digital voltmeter for deriving a digital representation of the value of a variable represented by an input signal including comparator means, means for applying the input signal to the comparator means, means for deriving a plurality of balancing signals and switching means for successively applying the balancing signals to the comparator means, the said switching means being responsive to the comparator means to continue the application of a balancing signal to the comparator means if upon application of that balancing signal the amplitude of the input signal is greater than the sum of the amplitudes of the balancing signals applied to the comparator means but removing the said signal if the amplitude of the input signal is less than that of the said sum, so that the final state of the switching means represents the value of the input signal; the combination of means for deriving a plurality of correcting signals and switching means responsive to the condition of the balancing signal switching means for applying predetermined combinations of the correcting signals to the comparator means to vary the effective value of the sum of the applied balancing signals and thus introduce corrections for given deviations of the input signal from a linear relationship with the variable to be represented in digital form.

2. A digital voltmeter for deriving a digital representation of the value of a variable represented by an input signal including comparator means, means for applying the input signal to the comparator means, a register having a series of bistable stages and a series of switches each responsive to an associated stage of the register to apply a given one of a series of balancing signals to the comparator means, successive stages of the register being successively responsive to the said comparator means to assume one or other of their stable states depending on the relative amplitudes of the input signal and the sum of the balancing signals applied to the comparator means upon application respectively of their associated balancing signals to the comparator means, each switch being arranged to continue the application of a balancing signal to the comparator means if the comparator means indicates that the amplitude of the said sum of balancing signals applied to the comparator means upon application of that signal is less than the amplitude of the said input signal, but to discontinue the application of a balancing signal if the amplitude of the said sum is greater than the amplitude of the said input signal so that the final state of the register represents the amplitude of the input signal; the voltmeter including a further series of switches responsive to the condition of the register to apply predetermined combinations of a plurality of correcting signals to the comparator means and thus vary the effective value of the sum of the applied balancing signals and introduce corrections for predetermined deviations of the input signal from a linear relationship with the variable to be represented in digital form.

3. A digital voltmeter according to claim 2 for repeatedly deriving digital representations of the value of a variable represented by an input signal by comparing the input signal with balancing signals derived from a cyclically variable reference signal from which the input signal itself has also been derived, including means operative at a predetermined point in the cycle of the reference signal for initiating operation of the comparator means for comparing the input signal with successive combinations of balancing signals.

4. A voltmeter according to claim 3, including amplitude sensitive means for adjusting the said predetermined point in the cycle of the reference signal at which operation of the comparator means is initiated.

5. A voltmeter according to claim 4, for repeatedly deriving digital representations of the values of variables represented by a plurality of input signals derived from a common cyclically variable reference signal by comparing each input signal successively with combinations of balancing signals derived from the reference signal, including means operative at predetermined points in the cycle of the reference signal for initiating comparison of the successive input signals with the balancing signals.

6. A voltmeter according to claim 2 including means for adjusting the phase of the reference signal to correspond with that of the input signal.

7. A voltmeter according to claim 6, in which the said phase adjusting means comprises means for deriving a voltage signal in quadrature with an original reference voltage, means for adjusting the magnitude of this quadrature signal and means for adding this quadrature signal to the original reference signal to derive a reference signal from which the balancing signals for comparison with the input signal may be derived.

8. A voltmeter according to claim 3, in which at least some of the switches for applying balancing signals to the comparator means include means for applying a reference voltage to a balancing resistor which is connected to the junction of three rectifying circuits so that a balance current flows into the junction which is dependent on the reference voltage and the balance resistor, the first rectifying circuit being arranged to apply the balancing current to a source of substantially constant potential when the polarity of the reference voltage is in the opposite sense to its polarity at the instant at which the switch is required to be operative, the second rectifying circuit being arranged to apply the balancing current to a source of biasing potential and the third rectifying circuit being arranged to apply the balancing current to the comparator means, the magnitude of the biasing potential being dependent on the state of the register so that, when the state of the register is such as to indicate that the balancing current through the associated balancing resistor should be applied to the comparator means, the third rectifying circuit is conductive but when the state of the register is such as to indicate that the balancing current should not be applied to the comparator means, the second rectifying circuit is conductive to conduct the balancing current to the said source of biasing potential.

References Cited by the Examiner

UNITED STATES PATENTS 3,045,230 7/62 Tripp ————— 340—347

ROBERT C. BAILEY, *Primary Examiner.*